Feb. 19, 1929.　　　　　　　　　　　　　　　　　　1,702,425
F. L. ALBEN
FRAME STRUCTURE FOR RAILWAY VEHICLES
Filed Aug. 13, 1927　　　3 Sheets-Sheet 1

INVENTOR
Frank L. Alben.
BY
Wesley G. Carr
ATTORNEY

Feb. 19, 1929.  
F. L. ALBEN  
1,702,425  
FRAME STRUCTURE FOR RAILWAY VEHICLES  
Filed Aug. 13, 1927  3 Sheets-Sheet 2

INVENTOR  
Frank L. Alben.  
BY  
Wesley G. Carr  
ATTORNEY

Feb. 19, 1929.
F. L. ALBEN
1,702,425
FRAME STRUCTURE FOR RAILWAY VEHICLES
Filed Aug. 13, 1927  3 Sheets-Sheet 3
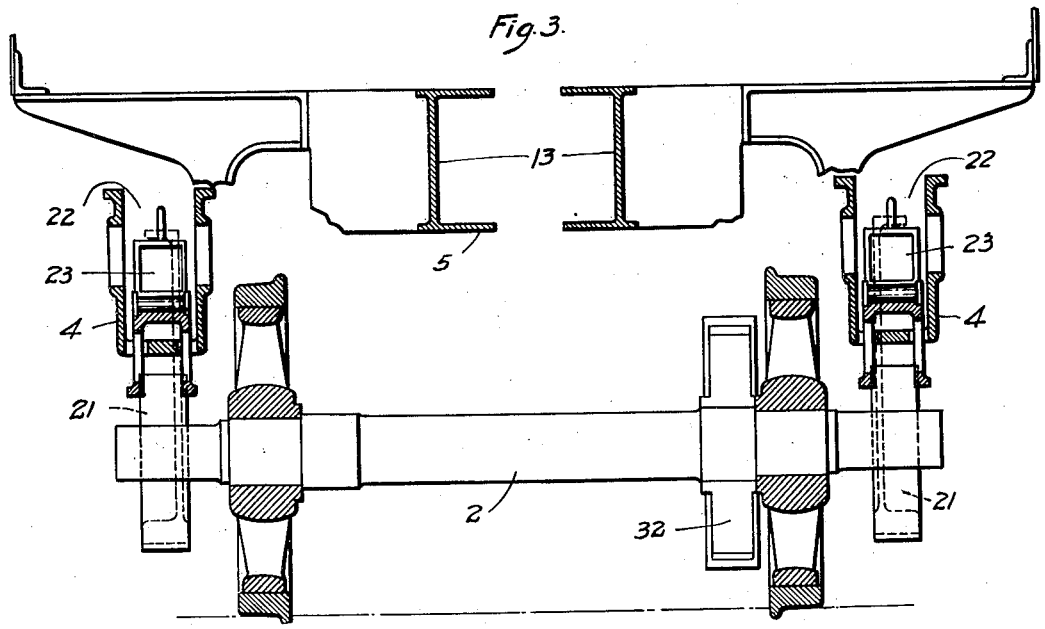
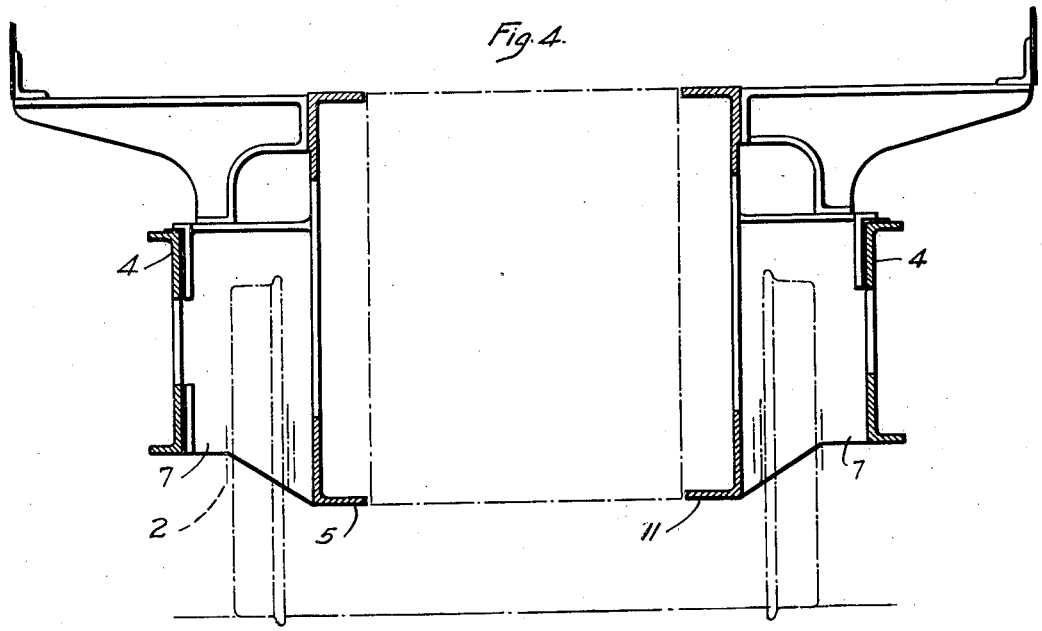
INVENTOR
*Frank L. Alben.*
BY *Wesley G. Carr*
ATTORNEY Patented Feb. 19, 1929.

1,702,425

UNITED STATES PATENT OFFICE.

FRANK L. ALBEN, OF PITTSBURGH, PENNSYLVANIA, ASSIGNOR TO WESTINGHOUSE ELECTRIC & MANUFACTURING COMPANY, A CORPORATION OF PENNSYLVANIA.

FRAME STRUCTURE FOR RAILWAY VEHICLES.

Application filed August 13, 1927. Serial No. 212,683.

My invention relates generally to electrically driven railway vehicles and more particularly to supporting beds or frame structures for locomotives.

Heretofore, a railway vehicle frame structure has usually comprised a pair of side or main frame members in which the wheel axles were journalled together with suitable end sills and transverse members which were secured to the said frame members in such manner that the required rigidity of the structure was obtained. A suitable floor or decking was applied to the frame member, and the cab or body portion of the locomotive was rigidly mounted thereon. However, this construction did not provide for mounting a heavy piece of apparatus, such as a motor-generator set or a Diesel-electric prime mover, in the center of the cab.

My present invention is directed to a vehicle-frame construction comprising the usual side frame members, together with a center frame member that is disposed between the side frame members and serves as a rigid backbone member that also constitutes an equipment deck upon which relatively heavy pieces of apparatus may be mounted.

An object of my invention is to provide a frame structure for electric locomotives that is of sturdy and simple construction and of relatively light weight.

Another object of my invention is to provide a railway-vehicle-frame structure having a central reinforcing or back-bone member that is adapted to withstand the shocks incident to buffing cars, and further provides a rigid support or equipment deck for a prime mover or other apparatus.

A further object of my invention is to provide a railway-vehicle-frame structure utilizing a centrally disposed back-bone member having a hollow mid portion of relatively large dimensions that serves to give strength and rigidity to the entire structure and also provides a storage space for fuel or other material.

In order that the foregoing and other objects may be made clearly apparent, reference will now be had to the accompanying drawings, in which:

Fig. 3 is a view, in cross section, of the frame structure taken along the line III—III of Fig. 2, and Fig. 4 is a view, in cross section, taken along the line IV—IV of Fig. 2.

Figure 1:
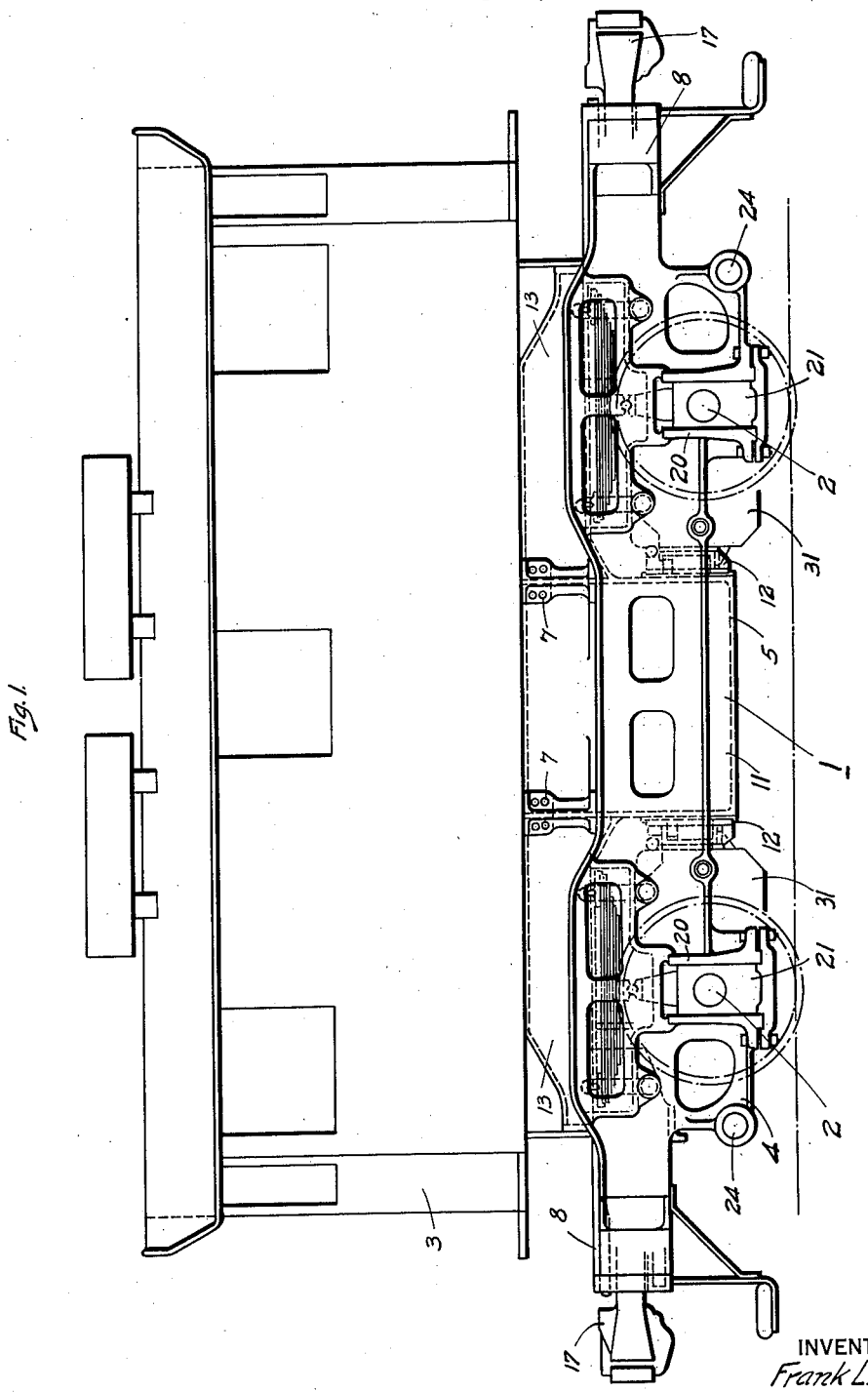
Figure 1 is a view, in side elevation, of a railway vehicle comprising a frame structure that embodies my invention.

Referring to Fig. 1 of the drawing, the railway vehicle therein illustrated comprises a truck-frame structure or bed member 1 of light web construction that is mounted upon the usual wheel axles 2 and supports a locomotive body or cab structure 3. The frame structure 1 in which my invention is embodied is shown in detail in Figs. 2, 3 and 4.

Figure 2:
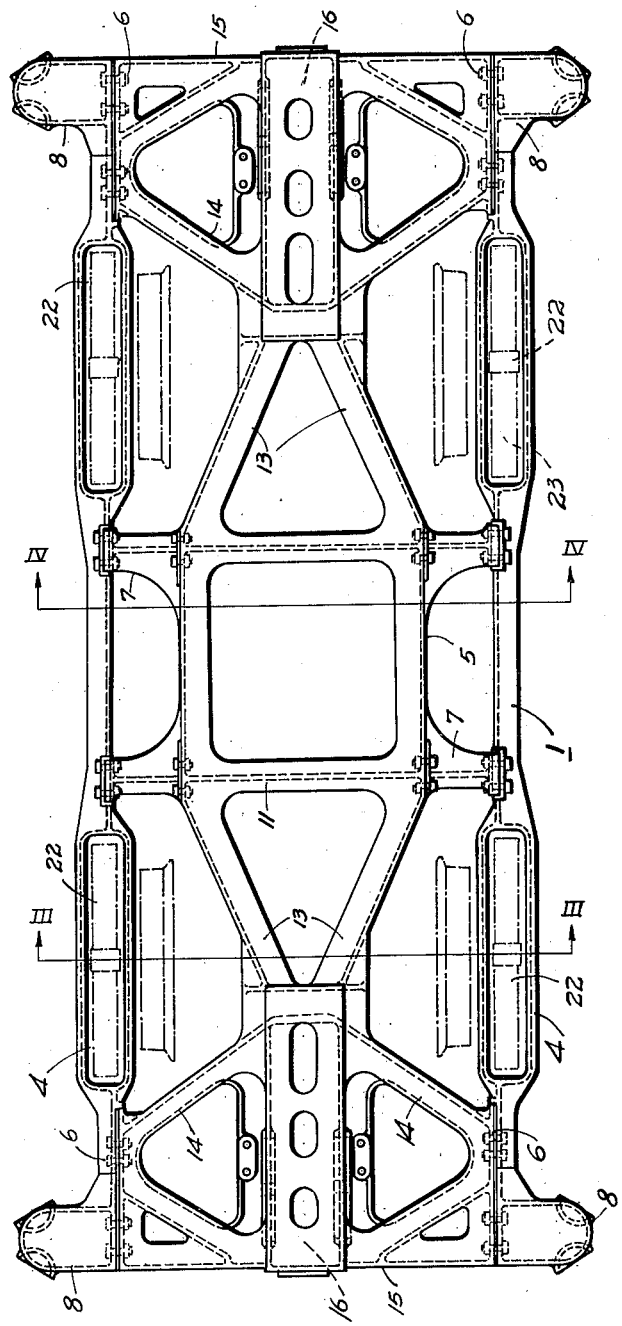
Fig. 2 is a plan view of a locomotive bed or frame structure constructed in accordance with the invention.

As shown in Fig. 2, the frame structure 1 comprises a pair of the usual side or main frame members 4 that are disposed in parallel relation, together with a center frame member or back-bone reinforcing structure 5 that is disposed between the side frame members 4. The ends of the side frame members 4 are secured to the center-frame member 5 by means of bolts or rivets 6. For the purpose of increasing the rigidity of the structure, a pair of bracket members 7 are interposed between the side frame members 4 and opposite sides of the center frame member 5 near the center of the frame structure and equally spaced therefrom. At each corner of the frame structure 1, a bumper member or corner piece 8 is secured to the sides of the center-frame member 5 and adjacent to the ends of the side-frame members 4.

The center frame member 5, which serves as a rigid longitudinal back-bone structure extending from end to end of the frame structure 1, is preferably cast as an integral piece. As shown in the drawing, the various portions of the center frame member 5 are symmetrically disposed with respect to a middle portion 11 that constitutes the central part of the vehicle frame 1. The middle portion 11 of the center frame member 5 is of relatively deep proportions, extending both above and below the side frame members 4 and is of substantially the shape of a hollow cube. The upper surface of the middle portion 11 serves as an equipment deck upon which may be mounted a Diesel electric generating unit (not shown) or other heavy piece of apparatus, and the hollow interior may serve as a storage space for fuel or water, or such other material as it may be found convenient to store therein.

On the lower portions of the faces of the cubical middle portion 11, and integrally formed therewith are motor-supporting brackets 12 that extend in the direction of the wheel axles 2. From the vertical edges of the middle portion 11, longitudinally disposed members 13 of channel shape, with their horizontal flanges facing inwardly converge toward the ends of the frame structure and unite with end sill portions 14 that constitute the transverse members for connecting the ends of the side frame members 4. The extreme ends of the center frame member 5 are so formed that, together with the corner members 8, they constitute a continuous face or bumper portion 15 across the ends of the frame structure 1. The end sill portions 14 are disposed in substantially the same horizontal plane that is occupied by the middle portion 11.

The end sill portions 14 of the center frame member 5 are of greater width than the middle portion 11 and are only approximately one-third as deep as the middle portion. The connecting longitudinal members 13 are so disposed that their upper surfaces lie in the plane of the top surface of the middle portion 11 and have their lower surfaces raised to substantially the top plane of the end portions 14 to provide clearance space in the neighborhood of the wheel axles 2. Each end portion 14 is provided, at its center, with a longitudinally disposed draw-bar pocket 16 that is adapted to receive a draw-bar mechanism 17.

The side frame members 4 which serve to support the frame structure 1 upon the wheel axles 2 are of the usual construction and are provided with depending pedestal jaws 20 that are adapted to receive the usual journal boxes 21 which are slidably mounted therein. Directly above the pedestal jaws 20 elongated recesses or chambers 22 are provided for receiving spring members 23 that are preferably of the usual semi-elliptical design and serve to resiliently support the frame member 1 upon the journal boxes 21 in the usual manner. In order that brake rigging (not shown) or other auxiliary apparatus may be mounted on the side frame members 4, integral bracket members 24 are provided.

Referring now to Fig. 1, the locomotive illustrated is designed to be propelled by means of motors 31 that are journalled upon the wheel axles 2 in the manner known in the art as axle-hung motors. The motors are further supported at their sides remote from the axles 2 by means of the motor-supporting brackets 12 that are integral parts of the center frame member 5. It may thus be seen from the drawing that the motors are suspended between the wheel axles 2 and the mid portion 11 of the center frame member 5 and beneath the longitudinal bracing members 13. In this position, the motors are freely accessible for inspection and repairing.

Although I have described a specific embodiment of the invention, it will be obvious to those skilled in the art that various modifications may be made in the details of construction and in the proportions of the several cooperating parts thereof, without departing from the spirit and scope of the invention as defined in the appended claims.

I claim as my invention:

1. In a vehicle-frame structure, a unitary center frame member comprising a relatively deep middle portion of substantially square cross section, the walls of said middle portion enclosing a substantially cubical space and end portions of greater width and less depth than the center portion.

2. In a vehicle-frame structure, a symmetrical unitary center frame member constituting the back bone of the frame structure, side frame members secured to the center frame member, recesses in the side frame members for receiving spring members and bumper members secured to the center frame member and the side frame members at each corner of the frame structure.

3. A vehicle frame comprising a pair of side frame members and a center frame member extending longitudinally of and between the side frame members, said center frame member having a relatively deep frame section that extends above the side frame members throughout its length and extends below the side frame members at its mid portion.

4. In a railway vehicle, a frame comprising the usual side frame members and a center frame member having a mid portion of substantially the shape of a hollow cube, wheel axles journalled in the side frame members and motors suspended between the wheel axles and the cubically shaped mid portion of the frame.

5. In a locomotive bed, a pair of substantially parallel side-frame members, a center frame member interposed between the side frame members and secured to their ends and bracket members disposed between the side-frame members and the mid portion of the center-frame member.

6. In a locomotive bed, a pair of substantially parallel side frame members, a center frame member interposed between the side frame members and secured to their ends, said center frame member having a relatively deep mid portion extending above and below the side frame members and bracket members for securing the side frame members to the mid portion of the center frame member.

7. In a railway vehicle, the combination with the usual side frame members of a center frame member disposed between the side frame members, said center frame member comprising a deep mid portion extending above and below the side frame members, end sill portions to which the ends of the side frame members are secured and channel portions for connecting the end sill portions to the mid portion, said end sill portions constituting the bumper frames and draft-gear-supporting means.

8. In a railway vehicle, the combination with a truck structure comprising the usual side frame members journalled upon a plurality of wheel axles, of a center frame member extending over the axles and having a deep mid portion extending above and below the side frame members, of a plurality of motors for driving the vehicle, said motors being disposed beneath the ends of the center frame member and between the deep mid portion of the center frame member and the axles.

9. In a railway vehicle, a frame comprising the usual side frame members and an internal center frame member, said center frame member comprising a hollow mid portion of subtially cubical shape, converging channel portions extending from the vertical edges of the cubical mid portion longitudinally of the frame and end portions on said channel portions, said end portions constituting sill members for supporting the ends of the side frame members and having integral bumper portions.

In testimony whereof, I have hereunto subscribed my name this 3rd day of August, 1927.

FRANK L. ALBEN.